Patented July 6, 1926.

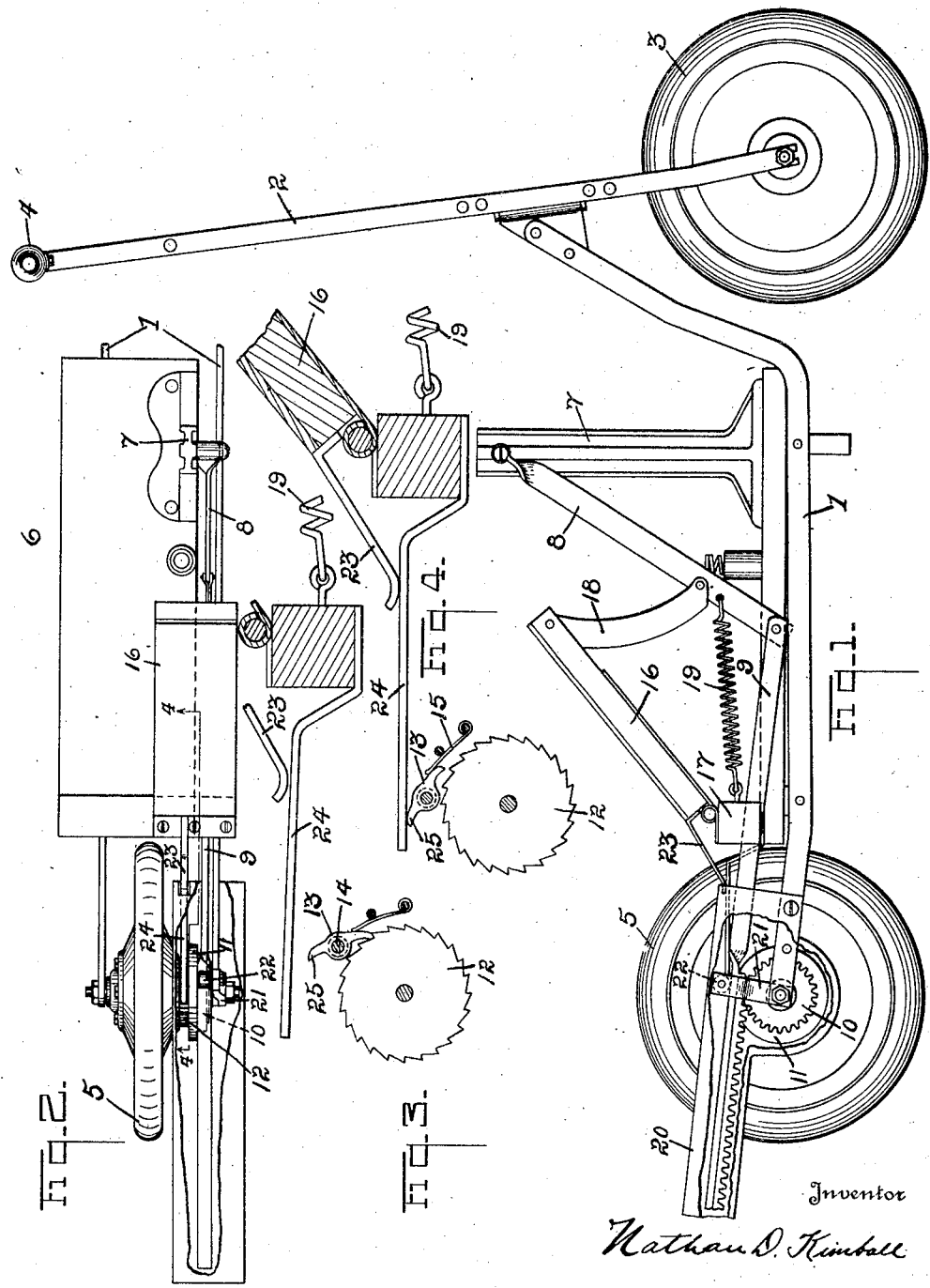

1,591,535

UNITED STATES PATENT OFFICE.

NATHAN D. KIMBALL, OF PERRYSBURG, OHIO.

SELF-PROPELLED VEHICLE.

Application filed March 17, 1926. Serial No. 95,201.

This invention relates to vehicles, but more particularly to driving means therefor, as for example, self-propelled vehicles which are operated by pedals or other means.

Objects of this invention are to provide a simple and efficient self-propelled vehicle which is so constructed as to enable a person to attain a relatively high rate of speed with a minimum amount of effort; to provide a driving arrangement for vehicles utilizing a rack and pinion operated by means of a swinging link which is capable of providing great power with a small amount of effort; and to provide a vehicle of the self-propelled type having the new and improved features of construction and arrangement and operation hereinafter described.

An embodiment of the invention is shown in the accompanying drawings, in which:

Figure 1 is a side elevation of a juvenile vehicle embodying the invention; Figure 2 is a top plan view of the vehicle shown in Figure 1 with some of the parts omitted and others broken away; Figure 3 is a diagrammatic view showing the mechanism for disengaging the pawl from the ratchet wheel when the pedal is in a depressed position; and Figure 4 is a view similar to Figure 3 showing the pawl disengaged and the pedal in normal position.

The illustrated embodiment of the invention comprises a juvenile vehicle having a metal frame 1, the forward end of which is curved upwardly, and pivotally connected to the forward end of the frame is an upright steering post 2 carrying a driven wheel 3 at the lower end and a steering cross bar 4 at the upper end. Mounted in the rear end of the frame 1 is a driving wheel 5 which is driven by mechanism hereinafter described.

A platform 6 is supported by the frame 1 between the wheels 3 and 5 and in use a person stands on this platform with one foot and with the other foot operates the driving mechanism. Mounted on the forward end portion of the platform 6 and at one side thereof is an upright support 7 to the upper part of which is pivoted one end of a lever 8. The lever 8 depends from its pivotal connection and has swinging movement like a pendulum, the lower end thereof terminating below the platform 6, to which end is pivoted a rack bar 9. The rack bar 9 extends rearwardly and the other end in the normal position of the parts is disposed considerably beyond the driving wheel 5 at one side thereof.

It is to be noted that the outer end portion of the rack bar 9 is provided with teeth, this portion constituting nearly one half the length of the bar. Meshing with the teeth on the rack bar is a pinion 10 positioned at one side of the wheel 5. The pinion 10 is fixed to a disk 11 and interposed between the disk 11 and the wheel 5 is a ratchet wheel 12 which is engageable by a pawl 13 journaled on a pin 14 fixed to the inner face of the disk 11. The pawl 13 may be held in engagement with the ratchet wheel by means of a leaf spring 15.

It will be seen that reciprocation of the rack bar 9 intermittently drives the rear wheel 5, that is as the rack bar moves forwardly, the pinion 10 rotates in a clockwise direction thereby engaging the pawl 13 with the ratchet wheel and thus driving the wheel 5, but when the rack bar 9 moves rearwardly, the pinion 10 and disk 11 rotates in a counter clockwise direction and the pawl 13 rides over the teeth on the ratchet wheel.

A pedal 16 hinged at one end to a block 17 mounted on the platform 6 is connected to an intermediate portion of the pendent lever 8 by means of a downwardly curved link 18 which is pivoted at its opposite ends to the respective parts. It is to be understood that the connection between the link 18 and lever 8 may be changed in accordance with the power desired. For returning the pedal, rack bar 9 and associated parts to normal position, a coil spring 19 is connected at one end to the block 17 and at the other end to a lower portion of the lever 8.

In operation the person may stand on the platform 6 with one foot and operate the pedal 16 with the other foot. After the pedal has been depressed to impart propelling power to the rear wheel 5, the pedal automatically returns to normal position by merely releasing the pressure thereon.

As heretofore pointed out, in normal position the outer end of the rack bar 9 projects a considerable distance beyond the end of the vehicle, and in order to cover this end and adjacent parts, a housing 20 is attached to the frame 1 and encases these parts. For guiding the movement of the rack bar 9 and to hold the same in engagement with the pinion 10, a bracket 21 extends upwardly from the frame 1 and carries a roller 22 at the upper end which engages the upper part of the rack bar 9.

Means are provided for automatically disengaging the pawl 13 from the ratchet wheel 10 when the pedal 16 is in its raised or normal position. In this instance an arm is fixed to the pedal and extends rearwardly therefrom, the outer end portion being curved upwardly. Secured to the block 17 and extending rearwardly into the housing 20 and terminating above the pawl 13 is an arm 24 of relatively flexible material so as to be readily depressed by the arm 23. As indicated in Figure 4 when the pedal 16 is in normal position the arm 23 engages the arm 24 and moves the same downwardly so that the outer end engages a projection 25 on the pawl 13 and rotates the pawl in a counter clockwise direction thereby disengaging the pawl from the ratchet wheel 10. By thus releasing the pawl from the ratchet wheel the rear wheel 5 is free to move in a counter clockwise direction, thereby enabling the vehicle to be moved rearwardly.

Although this invention has been described in connection with a juvenile vehicle, it is to be understood that other vehicles may be similarly driven or operated, and it is not intended that the invention be limited to juvenile vehicles because by increasing the size and proportion of the parts a vehicle admirably adapted to adults may be provided. Furthermore, the invention may be embodied in other types instead of the two wheel type. Therefore, the above description is to be given by way of illustration and not by way of limitation, and numerous changes in details of construction and arrangement of parts may be effected without departing from the spirit of the invention, especially as defined in the appended claims.

What I claim as new and desire to secure by Letters Patent is:

1. In a vehicle, a frame, a drive wheel therefor, a support carried by said frame forward of said wheel, a lever depending from the support, a rack bar connected to the lower end of said lever, a pinion meshing with the teeth on said rack bar, means for clutching said pinion to said drive wheel when the pinion is rotated in one direction and permitting said pinion to rotate freely of said drive wheel in the opposite direction, means engaging said lever intermediate its ends for imparting swinging movement thereto, and resilient means for returning said lever to normal position.

2. In a vehicle, a frame, a drive wheel therefor, a support on said frame in advance of said drive wheel, a lever pendent from said support, a rack bar connected to the lower end portion of said lever and extending outwardly therefrom, a pinion meshing with said rack bar and associated with said drive wheel, pedal means connected to said lever intermediate the ends thereof for imparting swinging movement thereto, and means for returning said lever to normal position.

3. In a vehicle, a drive wheel therefor, a support on said frame in advance of said drive wheel, a lever pendent from said support a rack bar connected to the lower end portion of said lever and extending outwardly therefrom a pinion meshing with said rack bar and associated with said drive wheel, a pedal mounted on said frame, a curved link pivotally connecting one end of said pedal to an intermediate portion of said lever for imparting swinging movement to said lever and means for returning said lever to normal position.

4. In a vehicle a drive wheel therefor, a support on said frame in advance of said drive wheel, a lever pendent from said support, a rack bar connected to the lower end portion of said lever and extending outwardly therefrom, a pinion meshing with said rack bar, means for clutching said pinion to said drive wheel when the pinion is rotated in one direction and permitting said pinion to rotate freely of said drive wheel in the opposite direction, a pedal mounted on said frame, a downwardly curved link connecting one end of said pedal to an intermediate portion of said lever, and spring means for returning said lever to normal position.

5. A juvenile vehicle comprising a frame having front wheel and a rear wheel carried thereby, means for steering the front wheel, an upright support on the forward part of said frame, a lever pivoted at one end to said frame and depending therefrom, a rack bar connected to the lower end portion of said lever and extending rearwardly therefrom, a pinion associated with said rear wheel and meshing with said rack bar, means for clutching said pinion to said rear wheel when the pinion is rotated in one direction and permitting said pinion to rotate freely of said rear wheel in the opposite direction, a pedal pivoted at one end to said frame, a curved link connecting the opposite end of said pedal to an intermediate portion of said lever, and spring means connecting said lever and said frame for returning said lever to normal position after having been swung forwardly by said pedal.

6. In a vehicle, a frame, a drive wheel therefor, a support on said frame in advance of said drive wheel, a lever pendent from said support, a rack bar connected to the lower end portion of said lever and extending rearwardly therefrom, a pinion meshing with said rack bar and associated with said wheel, means for operatively connecting said pinion and wheel, a housing for the outer end portion of said rack bar, pedal means for imparting swinging movement to said lever in one direction, and spring means for returning said lever to normal position.

7. In a vehicle, a frame, a drive wheel, therefor, a pinion associated with said drive wheel, pawl and ratchet means for clutching said pinion and drive wheel when said pinion is rotated in one direction, a rack meshing with said pinion and extending forwardly therefrom, a swinging lever pivoted at its lower end to said rack, pedal means for imparting forward swinging movement to said lever, spring means for returning said lever to normal position, and mechanism including a member carried by said pedal for disengaging said pawl from said ratchet when said pedal is returned to normal position.

8. In a vehicle, a frame, a drive wheel therefor, a pinion associated with said drive wheel, pawl and ratchet means for clutching said pinion and drive wheel when said pinion is rotated in one direction, a rack meshing with said pinion and extending forwardly therefrom, means including a pedal for reciprocating said rack, and means for disengaging said pawl from said ratchet means when said pedal is in normal position.

9. In a vehicle, a frame, a drive wheel therefore, a pinion adjacent said drive wheel, pawl and ratchet means for clutching said pinion to said drive wheel, a rack meshing with said pinion and extending forwardly therefrom, means including a pedal for reciprocating said rack, flexible means engageable with said pawl for moving same to inoperative position, and means carried by said pedal for actuating said flexible means when the pedal is in normal position.

In testimony whereof I have hereunto signed my name to this specification.

NATHAN D. KIMBALL.